United States Patent
Rothschild

(10) Patent No.: US 8,007,046 B2
(45) Date of Patent: Aug. 30, 2011

(54) ASSISTING PASSENGERS TO SLEEP WHILE SITTING

(75) Inventor: Michael Rothschild, Ramot-HaShavim (IL)

(73) Assignees: Michael Rothschild, Ramot-HaShavim (IL); Amit Stekel, Rechovot (IL)

( * ) Notice: Subject to any disclaimer, the term of this patent is extended or adjusted under 35 U.S.C. 154(b) by 362 days.

(21) Appl. No.: 11/569,996

(22) PCT Filed: Jun. 2, 2005

(86) PCT No.: PCT/IL2005/000582
§ 371 (c)(1),
(2), (4) Date: Nov. 29, 2007

(87) PCT Pub. No.: WO2005/117525
PCT Pub. Date: Dec. 15, 2005

(65) Prior Publication Data
US 2009/0152932 A1    Jun. 18, 2009

Related U.S. Application Data

(60) Provisional application No. 60/575,806, filed on Jun. 2, 2004.

(51) Int. Cl.
*A62B 35/00*    (2006.01)
*A47D 15/00*    (2006.01)

(52) U.S. Cl. ........................................ 297/485; 297/465

(58) Field of Classification Search .................. 297/465, 297/485
See application file for complete search history.

(56) References Cited

U.S. PATENT DOCUMENTS

| | | | | |
|---|---|---|---|---|
| 2,448,076 A * | 8/1948 | Bradley | 297/465 X |
| 2,449,741 A * | 9/1948 | Fitzpatrick | 297/465 X |
| 2,940,443 A * | 6/1960 | Baker | 297/465 X |
| 3,099,486 A * | 7/1963 | Scott | 297/465 |
| 3,136,581 A * | 6/1964 | Caballero | 297/465 |
| 3,179,360 A * | 4/1965 | Shelton et al. | 297/465 X |
| 3,278,230 A * | 10/1966 | Boyce et al. | 297/465 |
| 3,560,048 A * | 2/1971 | Flint | 297/465 |
| 3,827,716 A * | 8/1974 | Vaughn et al. | 297/465 X |
| 4,050,737 A * | 9/1977 | Jordan | 297/465 |
| 4,194,257 A | 3/1980 | Martin et al. | |
| 4,211,218 A * | 7/1980 | Kendrick | 602/19 |
| 4,302,847 A * | 12/1981 | Miles | 2/465 |
| 4,497,069 A * | 2/1985 | Braunhut | 2/2.5 |
| 4,571,000 A * | 2/1986 | Holder | 297/465 X |
| 4,639,946 A * | 2/1987 | Koenig | 297/465 |
| 4,685,454 A * | 8/1987 | Posey | 297/465 X |
| 4,807,937 A * | 2/1989 | Harrigan | 297/465 |
| 4,848,793 A * | 7/1989 | Huspen | 297/465 X |
| 5,031,960 A * | 7/1991 | Day | 297/465 X |
| 5,074,588 A * | 12/1991 | Huspen | 297/465 X |
| 5,154,487 A * | 10/1992 | Warburton | 297/465 |
| 5,301,371 A * | 4/1994 | Chao | 297/465 X |

(Continued)

*Primary Examiner* — Rodney B White

(57) ABSTRACT

A method and an apparatus for helping a user rest and sleep while in an upright sitting position on a seat by providing vertical and horizontal support to the user's upper body and head. The method consists of providing a seat add-on and fitting an adjustable vest that can cling to the seat add-on at varying heights and relieve the load on the lower part of the spine, putting some of it on the armpits and some on the back ribs, and of providing a head support cushion that enables the neck to relax while sustaining the head and neck in a vertical position. The seat add-on, the vest and the cushion in combination continuously support the seated user's upper body and head vertically and horizontally, to assist the user to rest and sleep in the vertical sitting position.

30 Claims, 6 Drawing Sheets

U.S. PATENT DOCUMENTS

| | | | |
|---|---|---|---|
| 5,544,363 A * | 8/1996 | McCue et al. | 297/465 X |
| 6,042,189 A * | 3/2000 | Wellman | 297/465 |
| 6,082,826 A | 7/2000 | Moreno | |
| 6,088,855 A | 7/2000 | Connolly | |
| 6,129,383 A * | 10/2000 | Kocher, Jr. | 297/465 X |
| 6,513,824 B2 * | 2/2003 | DuBose | 297/465 X |
| 6,793,291 B1 * | 9/2004 | Kocher | 297/465 X |
| 6,820,902 B2 * | 11/2004 | Kim | 280/808 |
| 6,863,350 B1 * | 3/2005 | McCulley et al. | 297/465 |
| 6,902,193 B2 * | 6/2005 | Kim et al. | 297/465 X |
| 7,237,848 B1 * | 7/2007 | Story et al. | 297/485 |
| 2002/0130507 A1 * | 9/2002 | Kim | 280/801.1 |
| 2003/0001378 A1 * | 1/2003 | Kim et al. | 280/801.1 |
| 2004/0174063 A1 * | 9/2004 | Kocher | 297/465 |
| 2005/0017566 A1 * | 1/2005 | Rizk | 297/465 |
| 2005/0179244 A1 * | 8/2005 | Schroth | 297/465 X |

* cited by examiner

Figure 1
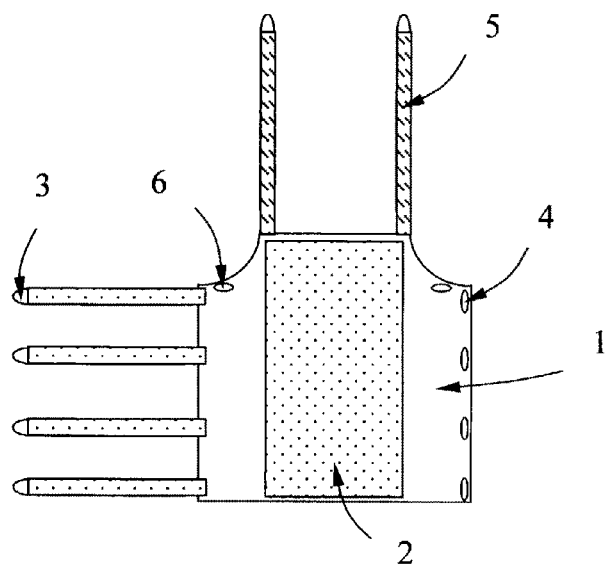
Figure 2
FIG. 2A
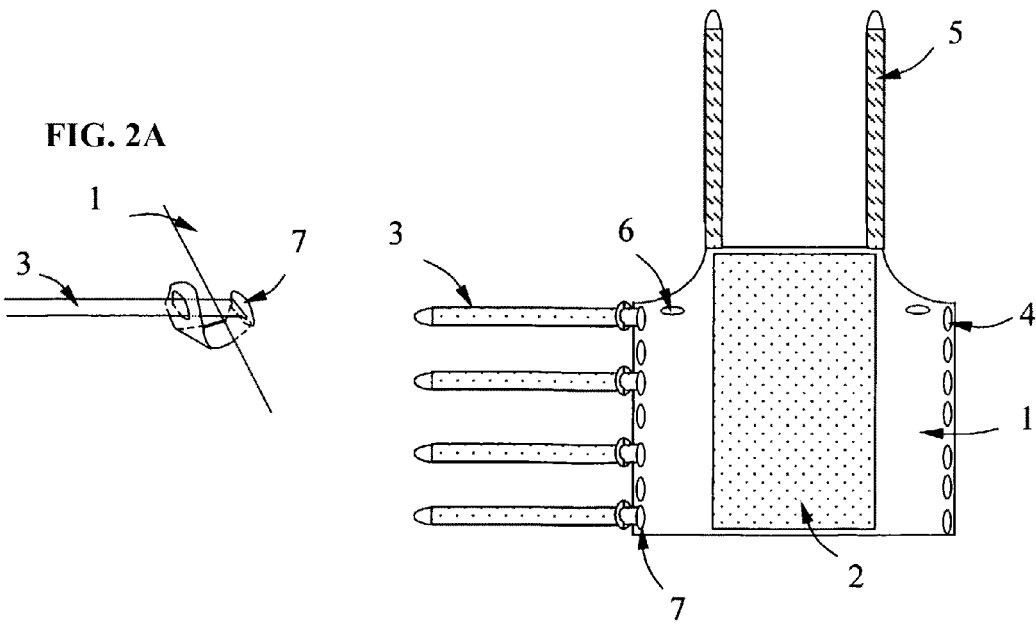

ASSISTING PASSENGERS TO SLEEP WHILE SITTING

RELATED APPLICATIONS

The present application is a US National Phase Application of PCT Application No. PCT/IL2005/000582, filed on Jun. 2, 2005 and claims the benefit under 119(e) of U.S. 60/575,806 filed on Jun. 2, 2004, the disclosures of which are incorporated herein by reference.

FIELD OF THE INVENTION

The present invention relates to a vertical rest assistance apparatus and the method implied in using the apparatus, especially for use in air and other long distance travel, and for people who have to work on seats for a long time but cannot sit comfortably for long.

BACKGROUND OF THE INVENTION

Currently in airplanes and trains, because of space limitation, the back of seats cannot lie down, other than in premium classes of travel. Passengers therefore have to sit vertically or almost vertically for a long time, or even sleep in the vertical or near-vertical sitting position. In the vertical sitting position, the waist, spine and neck can easily get tired because they have to support the whole weight of the upper body and head. During sleep, there is lack of support, the position of the body is unstable, resulting in muscle pain, strain and paralysis.

Many prior art inventions, such as those found in the references cited below, offer methods and devices to remove some of the load caused by a long stay in an upright position.

The state of the art in the field is believed to be represented by the following U.S. Pat. Nos. 6,266,825, 6,007,156, 4,996, 978, 4,834,457, 4,788,969, 3,827,716, 3,612,605, 3,531,158, 3,524,679, 3,191,599, 3,099,486, 3,063,752, 3,004,794, 2,851,033, 2,667,917, 2,667,913, 2,255,464, 1,722,205 and 284,024.

None of these inventions has yet materialized into a functional solution to the problem, possibly because the solution offered is either partial or inconvenient to use. For example, in U.S. Pat. No. 6,007,156 to G. H. Chang for "Vertical Rest Helping Method and Apparatus", there is described a device that fixes the passenger in a predetermined position, which is not necessarily the subjective optimal position as determined by the user, and without the simple ability to change posture from time to time, or to leave and return to the seat when desired, to subjectively adjust the sitting position for user comfort, or reach the user's pockets or clothing. Furthermore, the solution proposed may impair passenger safety by fixing the passenger to his seat and reducing his evacuation speed in dangerous situations.

There therefore exists a need to provide a device and method for assisting passengers to sleep in an upright position, but which overcomes at least some of the disadvantages of prior art devices and methods.

The disclosures of each of the publications mentioned in this section and in other sections of the specification are hereby incorporated by reference, each in its entirety.

SUMMARY OF THE INVENTION

The object of this invention is to provide a novel vest which allows passengers to sleep while sitting, but without fixing them rigidly to their seat.

In accordance with a first aspect, the present invention provides a light and portable vest which enables the user to sleep comfortably in an upright position in his seat.

In accordance with another aspect, the vest of the present invention comprises a detachable part that is comfortable to wear in normal use when the user leaves his seat.

In accordance with another aspect, the vest of the present invention is such that it can be readily adjusted in preparation for sleeping.

In accordance with another aspect, the vest of the present invention allows the passenger to choose his own preferred posture of sitting or sleeping and to change it from time to time.

In accordance with another aspect, the vest of the present invention allows the passenger reach his pockets, clothes and to generally move in his seat freely.

In accordance with another aspect, the vest of the present invention is also a life jacket, allowing the passenger to be prepared for dangerous situations and to evacuate his seat quickly.

There is therefore provided, in accordance with a first preferred embodiment of the present invention, apparatus for use by a subject, comprising:
(i) a vest worn by the subject, the vest having a first VELCRO surface on its rear side, and attachments for attaching the vest to the upper body of the subject, and
(ii) a seat having a back rest having a second VELCRO surface associated with its front surface, wherein the first and the second VELCRO surfaces interlock when the subject sits in the seat.

In this apparatus, the attachments are preferably such that the vest fits closely to the upper body of the subject.

In accordance with another preferred embodiment of the present invention, the vest is preferably constructed of material having rigidity, such that the vest provides support to the upper body of the subject.

Furthermore, the attachments of the vest preferably comprise straps easily connected by the subject.

In accordance with still another preferred embodiment of the present invention, the second VELCRO surface associated with the front surface of the backrest of the seat is preferably part of the front surface. Alternatively and preferably, the second VELCRO surface associated with the front surface of the backrest of the seat is part of an add-on element attachable to the backrest of the seat.

There is further provided in accordance with more preferred embodiments of the present invention, apparatus as described above, and also comprising a neck collar constructed of soft material. The neck collar may preferably be attached to the seat add-on.

In accordance with a further preferred embodiment of the present invention, the vest preferably comprises buoyancy elements such that it is also operative as a life vest.

Any of the above embodiments of the present invention are such that the subject is able to attach and detach himself from the seat without any handling of the vest or seat.

There is also provided in accordance with a further preferred embodiment of the present invention, a method of assisting a sedentary subject to sleep, comprising the steps of:
(i) providing a vest having a first VELCRO surface on its rear side, and attachments for attaching the vest to the upper body of the subject,
(ii) providing a seat having a back rest having a second VELCRO surface associated with its front surface,
(iii) fitting the vest closely onto the upper body of the subject, such that the vest provides support to the upper body of a sedentary subject, and (iv) seating the subject in the seat such that the first and the second VELCRO surfaces interlock, such that the vest stabilizes the upper body of the subject against vertical and horizontal forces.

According to this method, the subject is able to attach and detach himself from the seat without a need to handle the vest or the seat. The method also preferably enables the subject to adjust his seating position to determine a most comfortable position without a need to handle the vest or the seat.

BRIEF DESCRIPTION OF THE DRAWINGS

The present invention will be understood and appreciated more fully from the following detailed description, taken in conjunction with the drawings in which:

FIG. 1 is a schematic illustration of a vest, constructed and operative according to a preferred embodiment of the present invention;

FIG. 2 schematically illustrates a vest structure with an adjustable number of straps;

FIG. 2a is a partial illustration of a detail of FIG. 2, showing a strap in a buttonhole.

FIG. 4 schematically illustrates a first embodiment of a seat add-on;

FIG. 5 schematically illustrates a second embodiment of a seat add-on;

FIG. 6 schematically illustrates a third embodiment of a seat add-on;

DETAILED DESCRIPTION OF PREFERRED EMBODIMENTS

Reference is now made to FIG. 1 which is a schematic illustration of a vest, constructed and operative according to a preferred embodiment of the present invention. The vest comprises a backpiece 1, on the outer side of which is attached a plate 2 preferably made of VELCRO® material. Fastening straps 3 and 5 are provided, which are threaded through their respective buttonholes, 4 and 6, and then fastened at the best length for the user, to provide a snug yet comfortable fit. VELCRO may also be preferably used to fasten the straps at the correct length, but other fastening means may also preferably be used Reference is now made to FIG. 2, which depicts an improved embodiment of the vest of FIG. 1. In this embodiment, the number of fastening straps is variable. The means used to connect these straps to the vest at the best location can vary. In this picture, special buttonholes 7 are used, and additional corresponding buttonholes are displayed on the other side of the vest. The vest can also be closed by use of VELCRO material or similar, on both sides of the vest, replacing the buttonholes. A variable number of strips may preferably be used as in FIG. 2. Alternatively and preferably, a single one side VELCRO covered manifold replaces all the straps.

Figure 3:
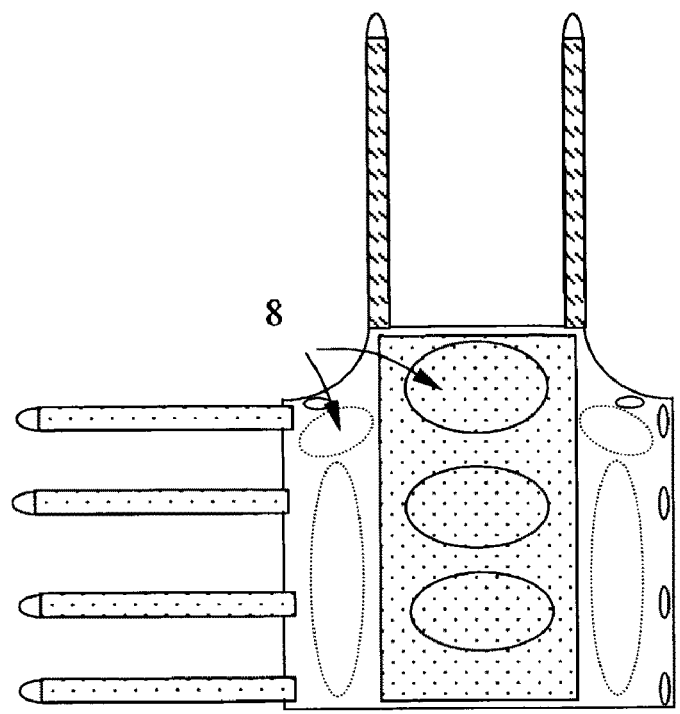
FIG. 3 schematically illustrates a vest with buoyant regions.

Reference is now made to FIG. 3, which illustrates a further preferred embodiment of the vest providing both better support and comfort, as well as floatation capabilities that enable the vest to function as a life vest in case of need. This is achieved through the introduction of built-in pockets 8 where buoyant material or inflatable cushions can be placed. The pockets can also be inflatable on their own. If the vest is designed to serve as a life vest, then additional features required by life vests can preferably be added, such as an automatic inflation mechanism, a whistle and a flashlight, as in conventional life vests.

Figure 4:
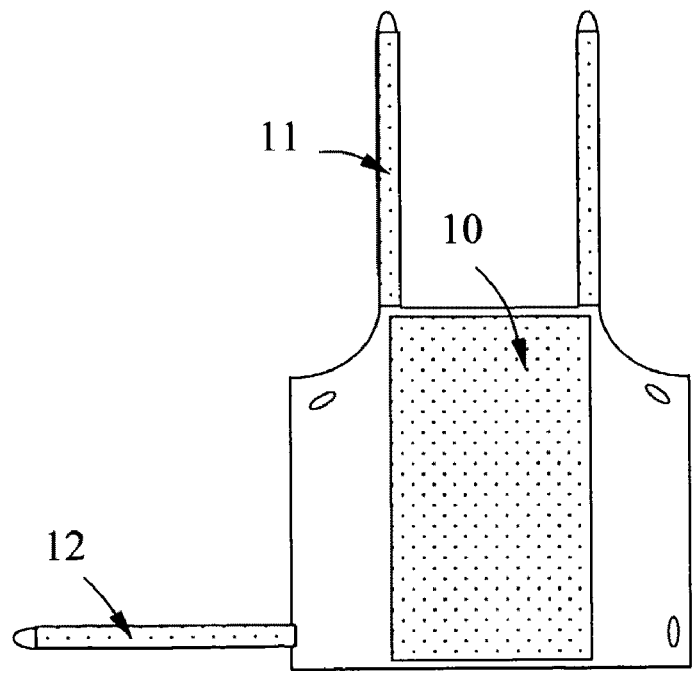

The vest of the present invention is intended to operate correctly by using it in conjunction with a seat add-on fixed to the seat, which attaches the vest to the seat in a readily adjustable and readily detachable manner, and yet supplies support to the whole back area of the vest Reference is now made to FIG. 4, which illustrates schematically a first embodiment of such a seat add-on, constructed and operative according to a preferred embodiment of the present invention. The seat add-on comprises a surface 10, preferably of VELCRO material, which is attached to the surface of the back of the seat preferably by means of straps 11, 12. The VELCRO material plate 2 on the back of the vest, clings to the VELCRO material surface 10 on the seat, and the strength of the attachment is such that it resists the vertical and horizontal forces that the weight of the person in the vest exerts by his tendency to droop downwards or to lean sideward when sleeping, and thus supports the body of the sleeping person in an upright position. As is seen, this embodiment of the seat add-on is similar in construction to the vest but is fastened to the seat rather than the passenger. In fact, when necessary, a regular vest, as described in the previous FIGS. 1-3 can also be used to serve as a seat add-on.

The preferred embodiments of the vest and seat add-on have been shown in the previous drawings and described as using a VELCRO material. The invention is also thuswise claimed. It is to be understood, though, that VELCRO is used as an example of any such similar material, having complemental parts which adhere to each when pressed together, and which are adapted for use as closure fastening components and which can be readily detached when needed, and especially separable fasteners of the hook and loop type. Alternative materials fulfilling these requirements can also be equally well used in the vest and seat add-on of the present invention.

Figure 4A:
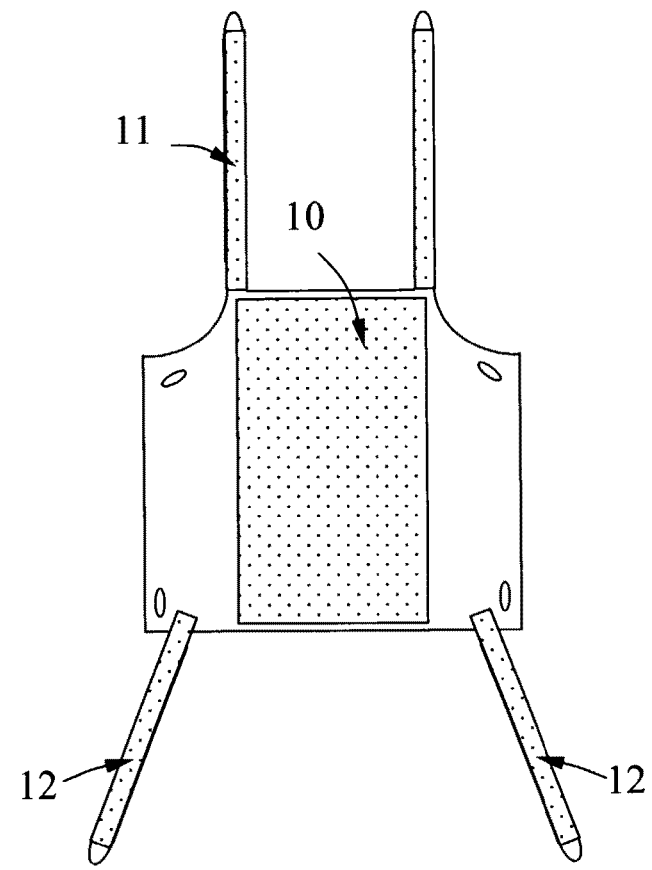
FIG. 4A describes another embodiment of the seat add-on of FIG. 4.

Reference is now made to FIG. 4A, which illustrates an additional embodiment of the seat add-on. This embodiment has on its lower side two strips and two button holes that enable it to be fastened to the lowest part of the back of the seat without risking any interference with equipment that might be attached to the back of the seat.

Figure 5:
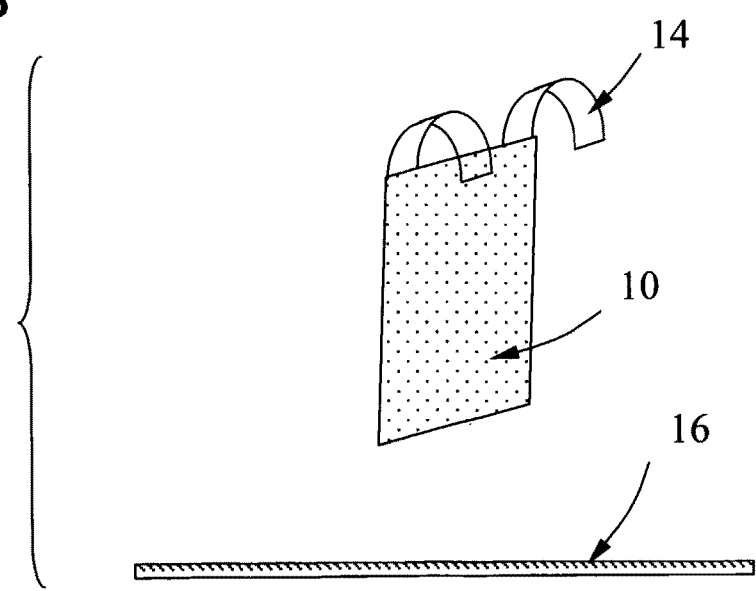

Reference is now made to FIG. 5 which describes another preferred embodiment of the seat add-on. In this embodiment, the VELCRO plate 10 is attached to two rigid hooks 14, strong enough to sustain the vertical forces exerted by the body weight of the passenger. A VELCRO covered strip 16 is preferably provided to counter the horizontal forces on the lower part of the VELCRO plate 10. Multiple strips 16 can be used to improve resistance to horizontal forces.

Figure 6:
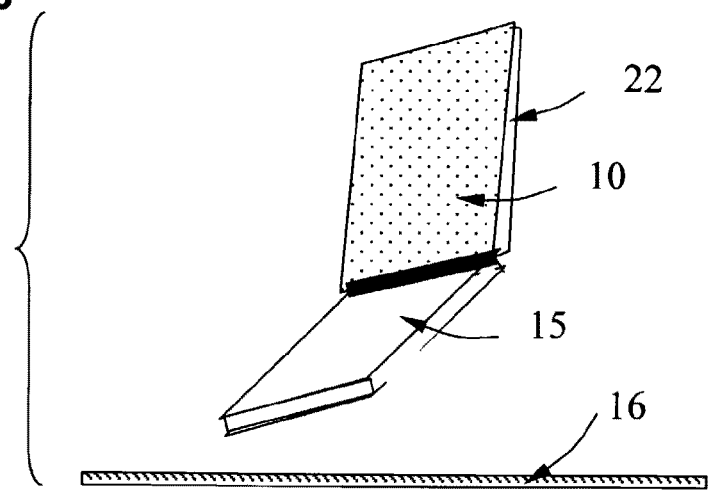

Reference is now made to FIG. 6 which describes another preferred embodiment of the seat add-on, which resembles a seat cover having a back plane 22 and a sitting base 15. The resistance to the vertical forces comes from the vertical rigidity of the back plane 22 on which the VELCRO plate 10 is mounted. Resistance to horizontal forces comes preferably from a VELCRO covered strip 16 or any other strip that fastens the back plane 22 to the back of seat. The horizontal forces can also be preferably resisted by adjustably fixing the angle between the back plane 22 and the bottom plane 15 or limiting the angle to a lower bounding value.

Figure 7:
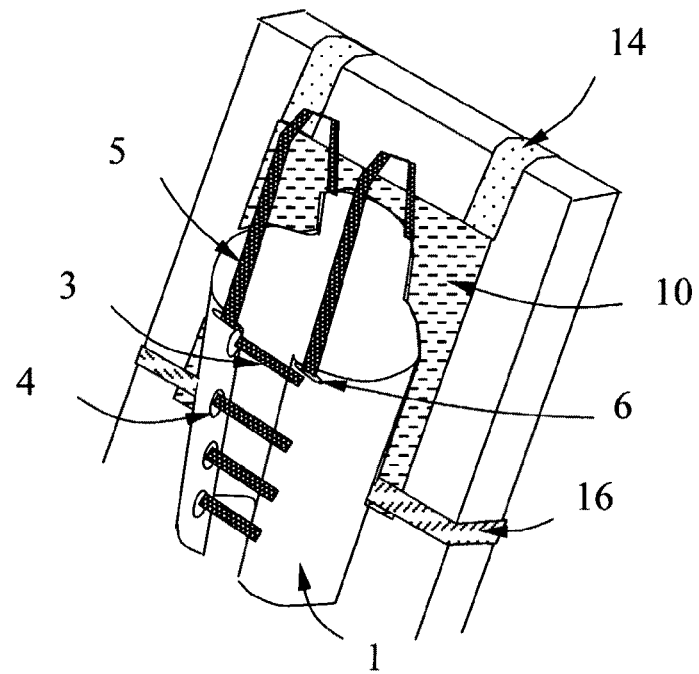
FIG. 7 describes the way the vest and the seat add-on are combined in use together.

Reference is now made to FIG. 7 which describes more fully how the vest and the seat add-on are combined and used to provide support for the passenger's back, against vertical and horizontal forces. The seat add-on is attached to the seat, either by the staff or by the passenger, using the particular attaching means to the seat which counter the vertical and horizontal forces. In the preferred embodiment shown in FIG. 7, the vertical forces will be sustained by the two hooks 14 and the horizontal forces by the strap (or straps) 16.

The passenger then dons the vest and uses the straps 3 and 5 to best adjust it to his body, for snugness of fit and for comfort. At this stage, while sitting down, the passenger puts his back on the seat at the height that best distributes the load on the various parts of the body. Several attempts may be needed to determine the optimum position, but since the attachment and detachment of the vest to the seat add-on is performed so simply, this is not an arduous task. Once the optimum position has been attained, the passenger no longer has to maintain the muscle tonus in his back to hold his back straight, since the vest does so for him.

One of the advantages of this solution is that the customer can do all the adjustments himself very easily. Another advantage is that he can leave his seat at any moment during the flight and then come back and enjoy the same support from the seat. The ease with which adjustments are achieved also enables him to improve his position during the flight if, at some stage, he feels the need to do so.

Figure 8:
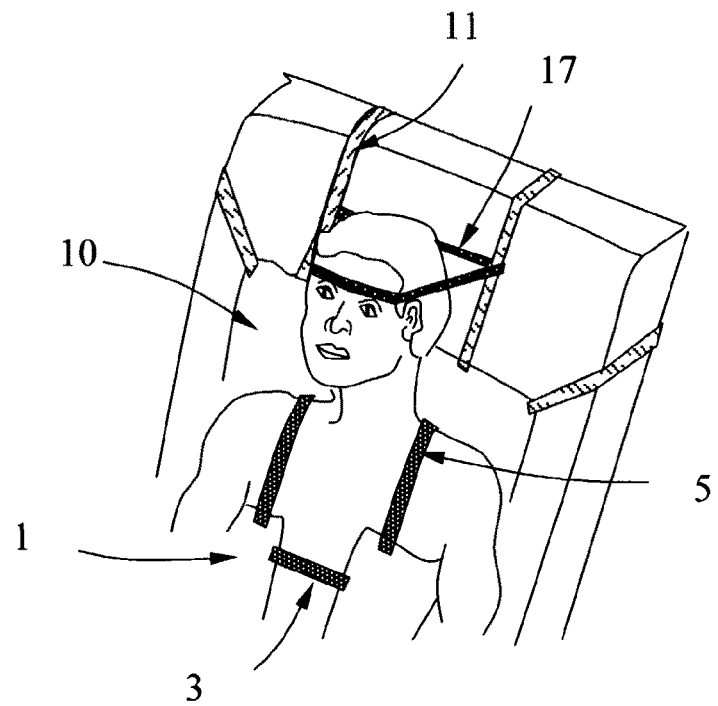
FIG. 8 describes how a simple additional strip can be used to provide head support.

Reference is now made to FIG. 8 which illustrates a simple additional strap 17 used, according to another preferred embodiment of the present invention, to achieve support for the head and neck. This is, however, not the manner in which most passengers would prefer to support their heads and necks, and another method is proposed for that end, as described in the FIGS. 9 and 10.

Figure 9:
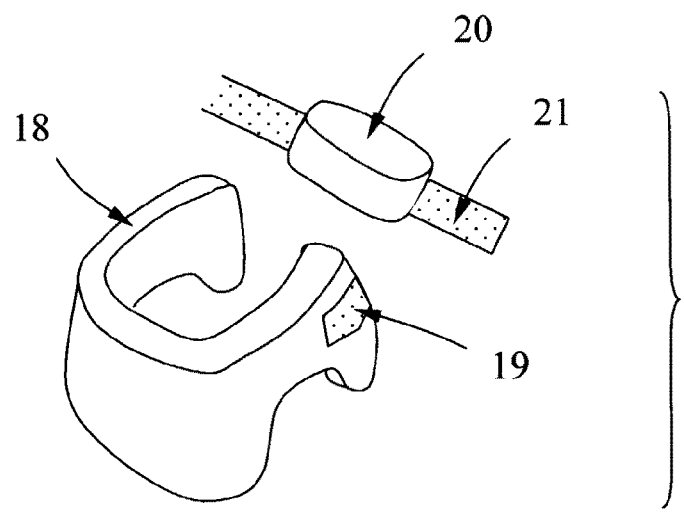
FIG. 9 schematically illustrates a head support cushion for use with the vest and seat add-on of the present invention.

Reference is now made to FIG. 9 which depicts a head and neck support device, according to another preferred embodiment of the present invention. The prior art neck supports commonly used for this purpose do not achieve the expected results since the head may tend to fall forward, as they support it mainly from other directions. The collar shown in FIG. 9 supports the head and neck from all directions. Its body 18 is in the form of a cushion that supports the head and neck in all directions. The collar can be attached to the seat add-on, or simply sits on the user's shoulders using the indent for the shoulders to stabilize it. A VELCRO plate 19 is provided to close the support circle around the neck using the rear cushion pad 20 and the VELCRO strips 21. Both cushions are preferably adjustable to fit a variety of neck sizes. The flexibility of the cushion and the strips should suffice for the adjustment to various neck diameters. Vertical flexibility can also be achieved through the inclusion of inflatable compartments.

Figure 10:
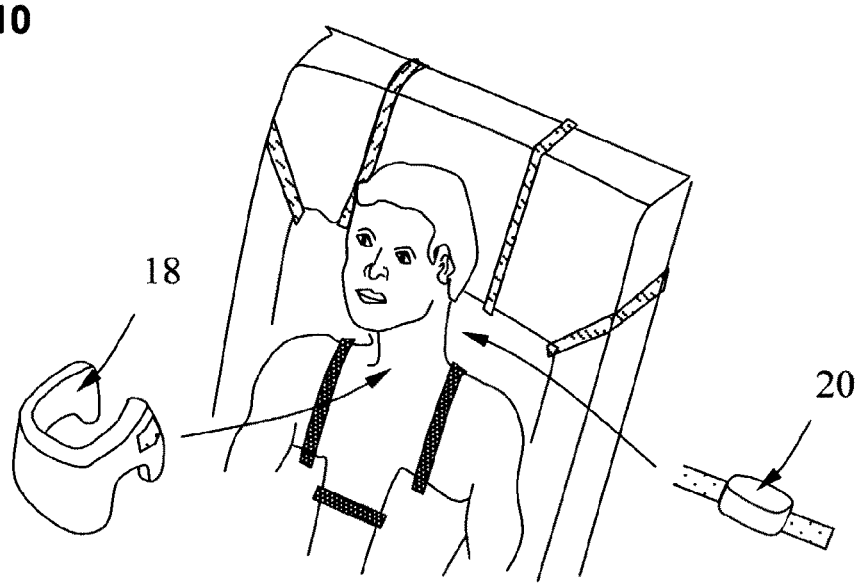
FIG. 10 describes the way the head support cushion is used.

Reference is now made to FIG. 10 which illustrates the manner in which the neck support cushion may be used. The body 18, should support the head and neck from the front, and provide additional support from the sides. The front should rest on the chest and its sides should rest on the shoulders, using the shoulder indent to position it in a stable manner. The cushion 20 is then added from the back to complete the support from all directions.

Figure 11:
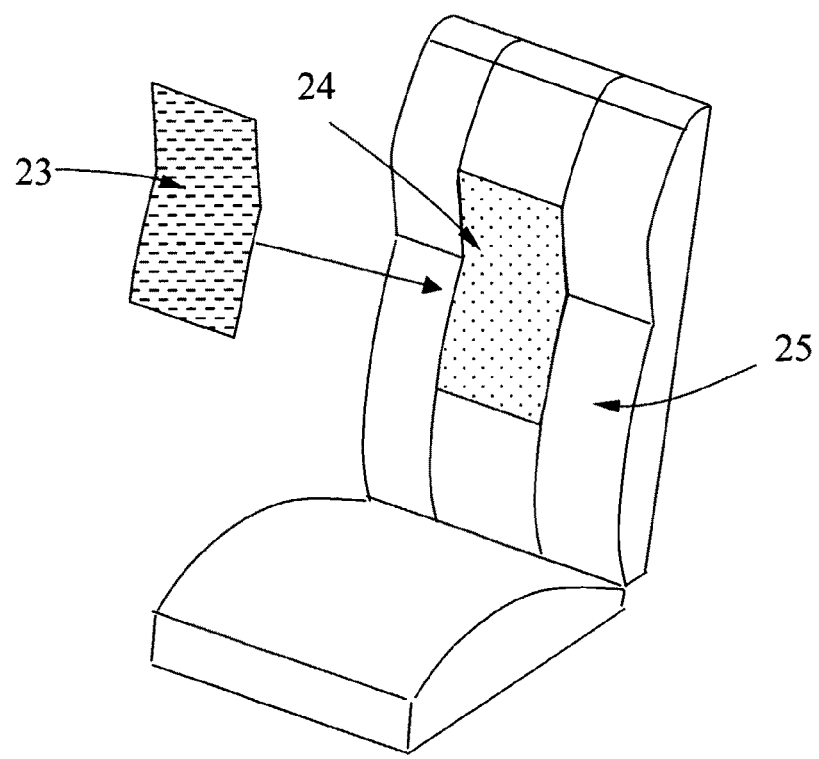
FIG. 11 schematically illustrates how the seat add-on can be obviated by the use of suitably constructed seats.

Reference is now made to FIG. 11 which shows how the seat add-on can be obviated by use of a specially constructed seat back. In this preferred embodiment, the VELCRO plate, 24, instead of being part of the seat add-on, is integrated into the seat 25 itself, making the device even easier to use. A second VELCRO plate 23 can preferably be used to cover the VELCRO plate 24 when the vest is not in use.

The sleep assisting vest assembly of the present invention may also be adapted for use as a child restraint addition for incorporation into children's safety seats for automotive use, providing the child with support to enable him to sleep comfortably and safely in an upright position.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A system for selectively securing a passenger to a commercial passenger seat comprising:
    (a) a vest having a back;
    (b) a separate backrest having:
        (i) at least two fastening members adapted to removably attach said separate backrest to a commercial passenger seat;
        (ii) a surface adapted to temporarily attach to said back of said vest;
    wherein said fastening members are adapted to be fastened to a corner of a backrest of said commercial passenger seat, said separate backrest including one each of said two fastening members secured to and extending from each of two bottom corners of said separate backrest, each fastening member adapted to extend across a corner of a backrest of the commercial passenger seat and fasten to its respective corner on the separate backrest from where it is secured and extends.

2. A system according to claim 1, wherein the seat is selected from a commercial airplane seat, a train seat and a child safety seat.

3. A system according to claim 1, wherein a vest back position with respect to the separate backrest is adjustable by the passenger.

4. A system according to claim 3, wherein the vest and separate backrest are configured so that said adjustment of said vest back position can be carried out by maneuvering of a passenger's body.

5. A system according to claim 1, wherein the vest is closable at a front thereof.

6. A system according to claim 5, comprising at least one strap adapted to close said vest.

7. A system according to claim 6, wherein the at least one strap is configured for fitting the vest on a body of the passenger.

8. A system according to claim 7, wherein said vest comprises a plurality of horizontal straps for closing and adjusting said vest.

9. A system according to claim 1, wherein the releasable attachment is positioned and configured to separate when force is applied in a direction consistent with getting up from said seat.

10. A system according to claim 1, wherein the vest supports the passengers in both vertical and horizontal directions with respect to the seat.

11. A system according to claim 1, wherein the vest supports the passenger at armpits thereof.

12. A system according to claim 1, wherein the vest enables the passenger to access pockets of said passenger.

13. A system according to claim 1, wherein the fastening members comprise a strap.

14. A system according to claim 1, wherein the fastening members comprise a hook.

15. A system according to claim 1, wherein the separate backrest position on the seat is adjustable.

16. A system according to claim 1, wherein the fastening members comprise a member fixed on the seat in a vertical orientation with respect to the floor.

17. A system according to claim 1, wherein the fastening members comprise one or more members fixed to at least one of the lowermost and uppermost regions of the seat back.

18. A system according to claim 1, wherein the surface and the back comprise a hook and loop connector for said releasable attachment of said separate backrest to a commercial passenger seat.

19. A system according to claim 1, wherein the vest comprises cushions adaptable to the passenger body contours.

20. A system according to claim 19, wherein the cushions are inflatable.

21. A system according to claim 1, comprising at least one of an adjustable head support and an adjustable neck support.

22. A system according to claim 21, wherein at least one of said head or neck supports is attachable to the backrest.

23. A system according to claim 22, wherein at least one of the head and neck supports comprises a back support and a front support.

24. A system according to claim 1, wherein said fastening members are positioned relative to said backrest of said commercial passenger seat when securing said separate backrest to said backrest of said commercial passenger seat in a manner which does not interfere with accessing equipment at a rear side of the commercial passenger seat.

25. A system according to claim 1, wherein said fastening members both horizontally and vertically restrain said separate backrest relative to said seat.

26. A system according to claim 1, wherein said separate backrest is horizontally restrained at most at a top and a bottom thereof relative to said commercial passenger seat.

27. A system according to claim 26, wherein said separate backrest is horizontally restrained only at a bottom thereof relative to said commercial passenger seat.

28. A system according to claim 1, wherein said back of said vest is selectively and securely attached to said separate backrest in a manner which allows user adjustment by body movement while providing support when sleeping.

29. A system according to claim 1, wherein said fastening members vertically restrain said backrest both at a top and at a bottom thereof.

30. A system according to claim 1 wherein said vest and said separate backrest are adapted to be used as a safety addition to a safety restraint system included in the commercial passenger seat.

* * * * *